United States Patent
Rebeaud et al.

(10) Patent No.: US 8,413,504 B2
(45) Date of Patent: Apr. 9, 2013

(54) HIGH CONTRAST CAPILLARY DEPTH GAUGE AND WATCH INCLUDING THE SAME

(75) Inventors: Nicolas Rebeaud, Le Mont-sur-Lausanne (CH); Michel Sagardoyburu, Cornaux (CH)

(73) Assignee: The Swatch Group Research and Development Ltd, Marin (CH)

( * ) Notice: Subject to any disclaimer, the term of this patent is extended or adjusted under 35 U.S.C. 154(b) by 339 days.

(21) Appl. No.: 12/946,467

(22) Filed: Nov. 15, 2010

(65) Prior Publication Data

US 2011/0113877 A1   May 19, 2011

(30) Foreign Application Priority Data

Nov. 18, 2009   (EP) .................................. 09176366

(51) Int. Cl.
*G01F 23/00* (2006.01)

(52) U.S. Cl.
USPC .............................................. 73/302; 73/291

(58) Field of Classification Search .................... 73/291, 73/299, 302
See application file for complete search history.

(56) References Cited

U.S. PATENT DOCUMENTS

| 3,188,864 A | * | 6/1965 | Dean ............................... 73/300 |
| 4,098,110 A | | 7/1978 | Bowden |
| 4,350,042 A | * | 9/1982 | MacGregor .................. 73/865.1 |

FOREIGN PATENT DOCUMENTS

GB               919953 A        2/1963

OTHER PUBLICATIONS

John Knight, et al., "Depth gauges, contents gauges and miscellaneous equipment problems reported in the Diving Incident Monitoring Study," South Pacific Underwater Medicine Society (SPUMS) Journal, Mar. 2003, pp. 34-37, vol. 33, No. 1.

* cited by examiner

*Primary Examiner* — Hezron E Williams
*Assistant Examiner* — Nathaniel Kolb
(74) *Attorney, Agent, or Firm* — Sughrue Mion, PLLC

(57) ABSTRACT

Capillary depth gauge (1) including at least one capillary tube (2) of triangular section arranged against a background (3) opposite an observation surface (5) and visible by transparency from the observation surface when the tubular section is substantially filled with water, at least one reflection surface (4), visible by reflection from said observation surface when the tubular section is substantially filled with air, said tube forming an isosceles triangle whose equal angles ($\alpha$) have an angular value of between 48 and 60 degrees.

11 Claims, 5 Drawing Sheets

HIGH CONTRAST CAPILLARY DEPTH GAUGE AND WATCH INCLUDING THE SAME

This application claims priority from European Patent Application No. 09176366.4 filed Nov. 18, 2009, the entire disclosure of which is incorporated herein by reference.

FIELD OF THE INVENTION

The invention concerns a capillary depth gauge including at least one capillary tube of triangular section arranged against a background opposite an observation surface and visible by transparency from the observation surface when the tubular section is substantially filled with water, and at least one reflection surface. The invention also concerns a watch including a depth gauge of this type.

BACKGROUND OF THE INVENTION

Depth gauges are devices that are widely used in some types of use, such as for example for diving. Several types of devices exist. Among these, capillary depth gauges are well known.

A conventional capillary depth gauge includes a glass tube closed at one end. When it is immersed in water, air remains trapped in the tube, on the closed side. Water penetrates through the aperture and compresses the air. The pressure exerted on the area of trapped air increases as a function of the increase in depth. This effect is used to display the depth reached, using a scale provided in immediate proximity to the depth gauge or directly thereon. Thus, during use in diving, when a diver moves away from the surface of the water, the air is compressed and depth can be measured as a function of the position of the air-water transition area in the tube.

It is often difficult to read this type of depth gauge since the contrast between air (transparent gas) and water (transparent liquid) is low. The refractive index variation as a function of the presence of water in the capillary tube is manifested as a variation in the reflective index. It is this inequality in the reflection coefficient that characterizes the contrast. To improve the contrast, the capillary tube can be given a particular shape. For example, the round profile can be replaced by a triangular profile. When the tube is filled with air, in some incident angle conditions, the difference in refractive index between the air and the capillary tube material produces total reflection of the light. This total light reflection is used to reflect an image of whatever is on the side of the capillary tube, such as a white background, characters or a scale. When the tube is filled with water, the difference in index between the water and capillary tube material is small or nonexistent. There is no longer total reflection of the light. Light passes through the capillary tube and the water. The capillary tube background then becomes visible. If an intensely coloured background is provided, for example a black background, the background becomes clearly visible. This type of solution corresponds to the depth gauge disclosed in GB Patent No. 919953.

With this solution, drops of water form in the capillary tube, since the difference in pressure due to the capillary effect at the air-water interface is not uniform. The depth gauge disclosed in this document thus provides limited readability. The optical effect obtained does not allow easy and precise reading.

SUMMARY OF THE INVENTION

To prevent this situation arising, and particularly to prevent the presence of drops of water inside the capillary tube and also to improve readability, the invention provides different technical means.

To achieve this, the invention provides a capillary depth gauge including at least one capillary tube of triangular section arranged against a background opposite an observation surface and visible by transparency from the observation surface when the tubular section is substantially filled with water, at least one reflective surface, visible by reflection from said observation surface when the tubular section is substantially filled with air. According to the invention, said tube forms an isosceles triangle whose equal angles ($\alpha$) have an angular value of between 48 and 60 degrees.

These features improve the readability of a capillary depth gauge.

According to an advantageous embodiment, angle $\alpha$ has a value of between 50 and 55 degrees. Thus, the capillary tube section is given a shape that allows pressure to be distributed as well as possible while preserving surfaces that can be used to produce the optical effect. An equilateral or close to equilateral triangular section allows the three pressure concentration points (i.e. the three corners) to be distributed around the centre of the capillary tube and placed at a substantially equal (or very slightly different) distance from each other.

In another advantageous embodiment, angle $\alpha$ is approximately equal to 50 degrees. This angle provides a particularly efficient optical effect.

According to another advantageous embodiment, the width of the narrowest surface of the tube (preferably arranged against the background) is approximately less than 1.5 mm. Beyond this dimension, the capillary effect decreases, and the depth gauge's performance is highly likely to deteriorate.

According to yet another advantageous embodiment, the tube is arranged so as to present two active sides visible from the observation surface. This variant is easily obtained if the background and reflection surface form an angle of substantially 90 degrees.

According to another advantageous embodiment, the capillary tube is arranged so as to present a single active side visible from the observation surface. This variant is easily obtained if the background is substantially inclined, i.e. not perpendicular relative to the direction of visibility of an observer. For example, this variant can be obtained with an arrangement wherein the background and the reflection surface form an angle of more than 90 degrees and preferably of between 100 and 120 degrees.

Finally, according to an advantageous embodiment, the depth gauge includes a plurality of capillary tubes arranged side by side or in immediate proximity to each. According to this embodiment, there are preferably two or three tubes, so as to improve readability and ensure a longer life if operation of one of the tubes can no longer be ensured. For example, one tube could be obstructed by a deposition.

The invention also provides a watch including a depth gauge described above. According to an advantageous embodiment, the depth gauge is arranged on the periphery of the case and has an aperture in liquid communication with the ambient environment.

DESCRIPTION OF THE DRAWINGS

All the embodiment details are given in the following description, completed by FIGS. 1 to 8, given solely for the purpose of non-limiting example, in which the same references indicate similar elements and in which.

DETAILED DESCRIPTION OF THE INVENTION

Figure 1:
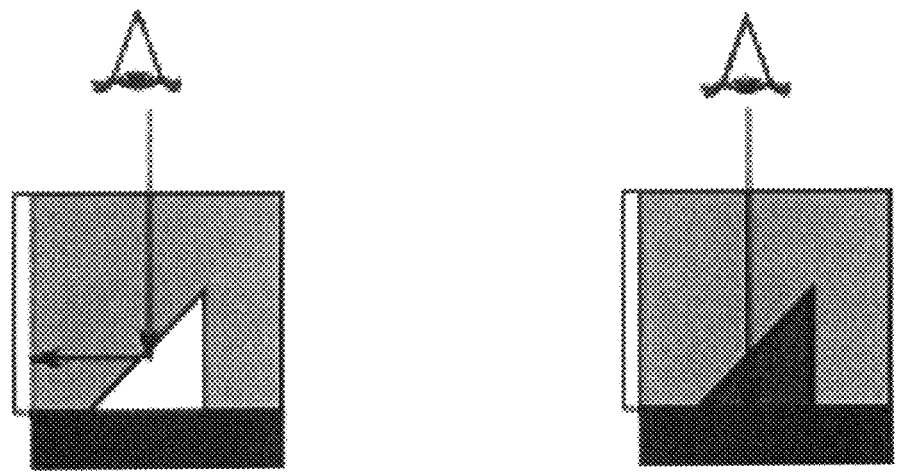
FIG. 1 is a transverse cross-section of a depth gauge of the prior art devised with a capillary tube with a right angled triangle shaped profile.

FIG. 1 shows a depth gauge of a known type. It includes a capillary tube whose profile forms a right angled triangle. This type of arrangement produces a reflection effect in a direction oriented at substantially 90 degrees relative to the direction of an observer's gaze when the tube is filled with air, as shown in the left portion of FIG. 1. Conversely, when the capillary tube is filled with water, the observer can see the bottom of the depth gauge since the 90 degree reflection effect fades away. The arrangement using a right angled triangle confers a single visible or accessible surface from the user's visual point. This arrangement, with a right angled triangle offers limited readability.

Figure 2:
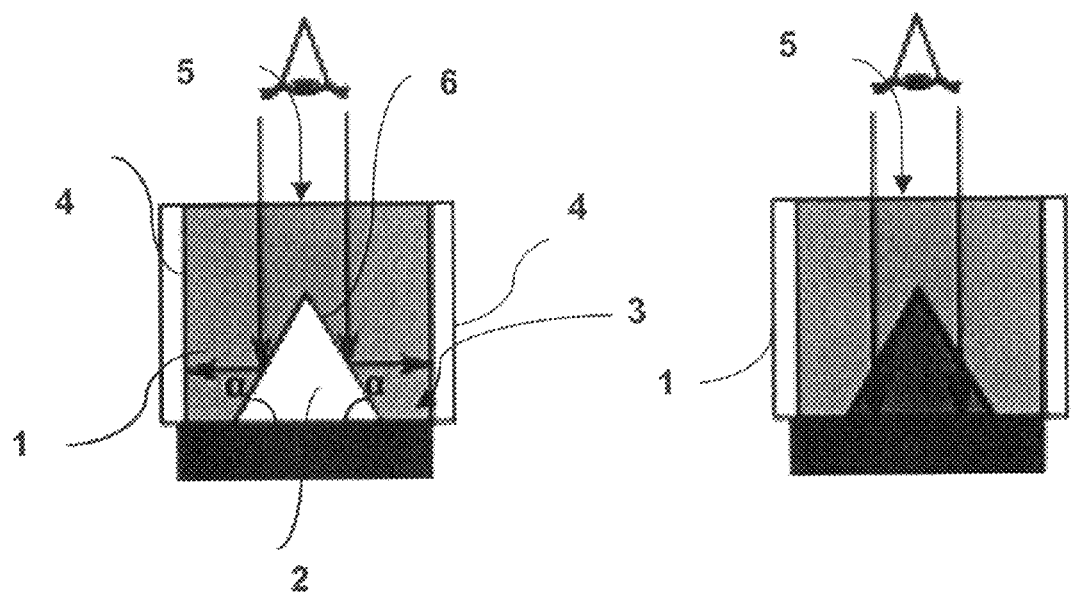
FIG. 2 is a transverse cross-section of a depth gauge according to a first embodiment of the invention.

FIG. 2 illustrates the basic principle of a depth gauge 1 with a capillary tube 2 according to the invention, devised to improve visibility and thus make it easier to read the depth. In the case of use by a diver, it is important for the depth to be read reliably and precisely to ensure the diver's safety, in particular if he has to make decompression stops as he moves back up to the surface. The capillary tube 2 is in the form of an isosceles triangle with two angles α of between 50 and 55 degrees. One advantageous embodiment, with an angle α of substantially 50 degrees gives a particularly advantageous effect. The capillary tube is placed against a background 3 provided for optimising visibility from an observation surface 5 substantially opposite said background. At least one and preferably two reflection surfaces 4 are provided on each side of capillary tube 2. In the example shown in FIG. 2, the surfaces are arranged to form an angle of substantially 90 degrees relative to background 3. Other angles may also be used. Reflection surfaces 4 are formed by longitudinal edges, along capillary tube 2, on each side thereof. According to various embodiments, the reflection surfaces are provided with patterns, markings or inscriptions to be seen by the user.

Owing to the presence of two active sides 6 visible from observation surface 5, the isosceles triangle gives a total internal reflection effect, which is interrupted by the presence of water. Thus, as shown on the left side of FIG. 2, when the tube is in the presence of air, the reflection effect is produced. The user sees what is on reflection surfaces 4. In the presence of water, as shown on the right side of FIG. 2, the reflection effect ceases and the user sees background 3 of the capillary tube.

Figure 3A:
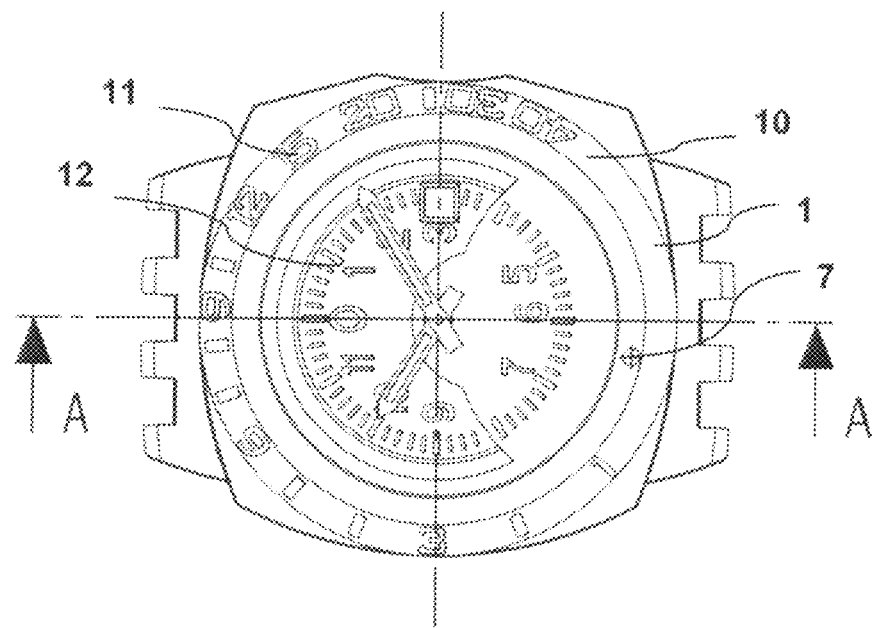
FIGS. 3a and 3b show an example of a depth gauge integrated in a watch case.
Figure 3B:
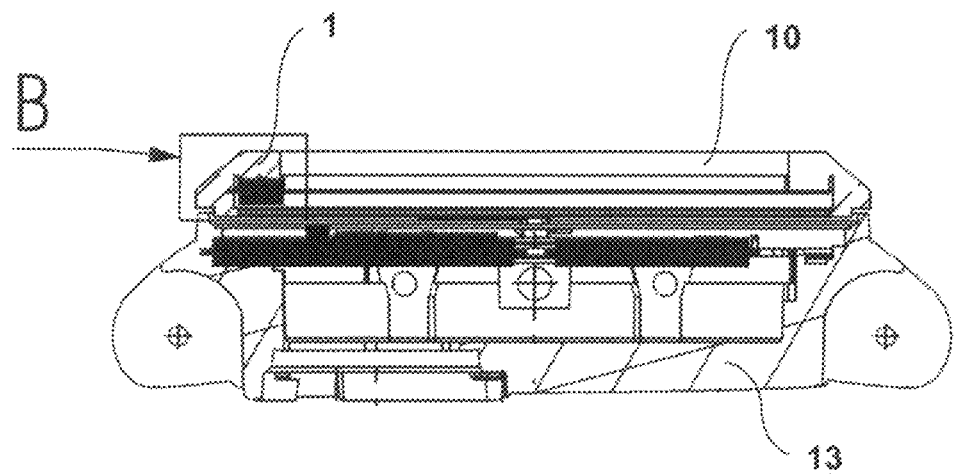
Figure 4:
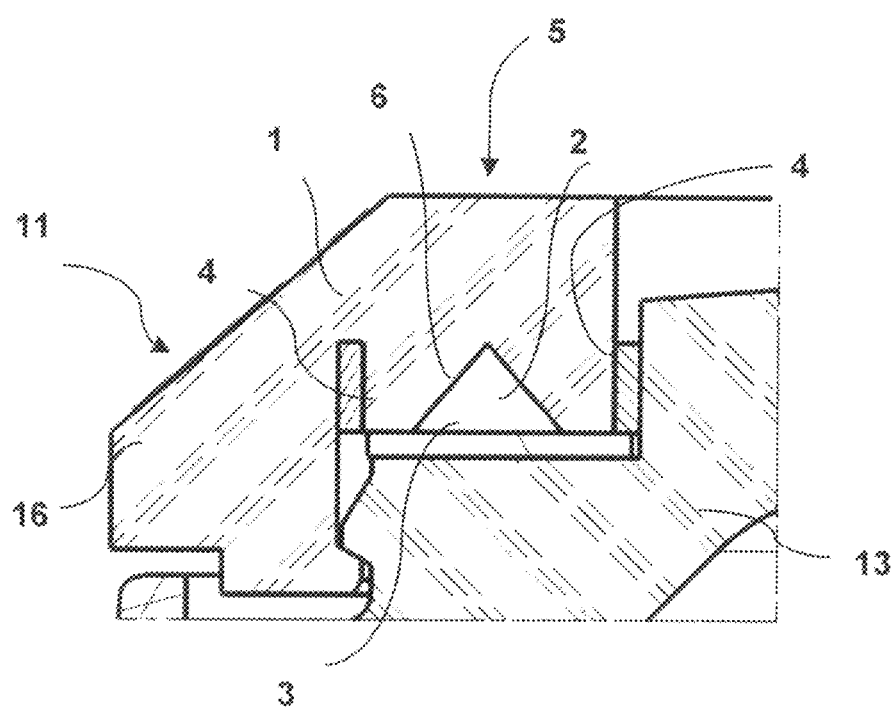
FIG. 4 shows an enlarged cross-section of the integrated depth gauge of FIG. 3.

FIGS. 3a and 3b illustrate an example of depth gauge 1 integrated in a watch 10 provided with a case 13. The depth gauge is arranged on the periphery of case 13, avoiding the hands and figures indicating the time. An aperture 7 in the capillary tube is arranged to provide a liquid communication with the ambient environment. Thus, when the watch is immersed, the water can penetrate the inside of capillary tube 2. FIG. 3b is a transverse cross-section of case 13 and shows an area B in which the depth gauge is integrated in said case. This area B is shown again in an enlarged view in FIG. 4. This Figure illustrates depth gauge 1 implanted in case 13 with capillary tube 2 placed on background 3 between two reflection surfaces 4. These elements are all arranged in a bezel made of glass or plastic or another translucent material which is anchored on the periphery of the case.

Figure 5:
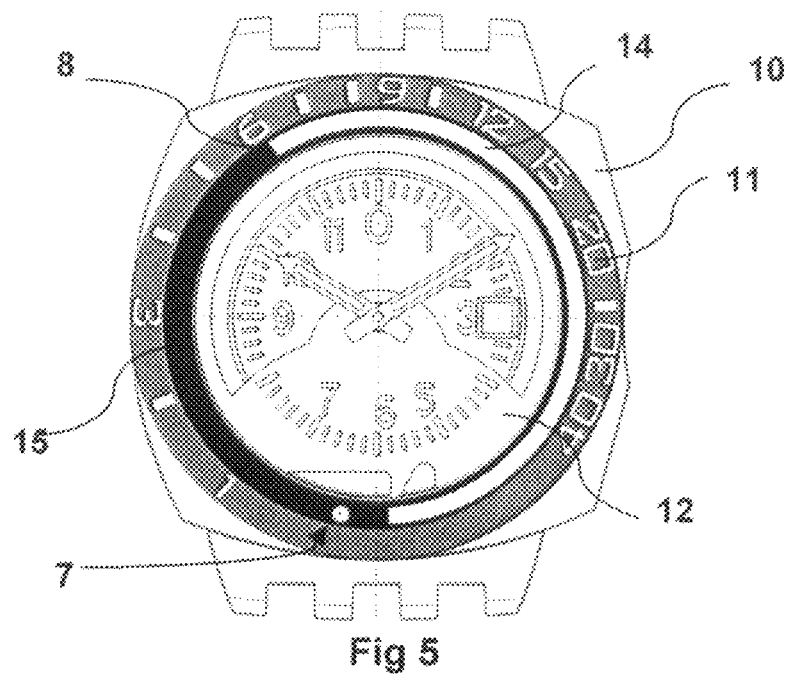
FIGS. 5 and 6 show the operation of a watch provided with a depth gauge according to the invention.
Figure 6:
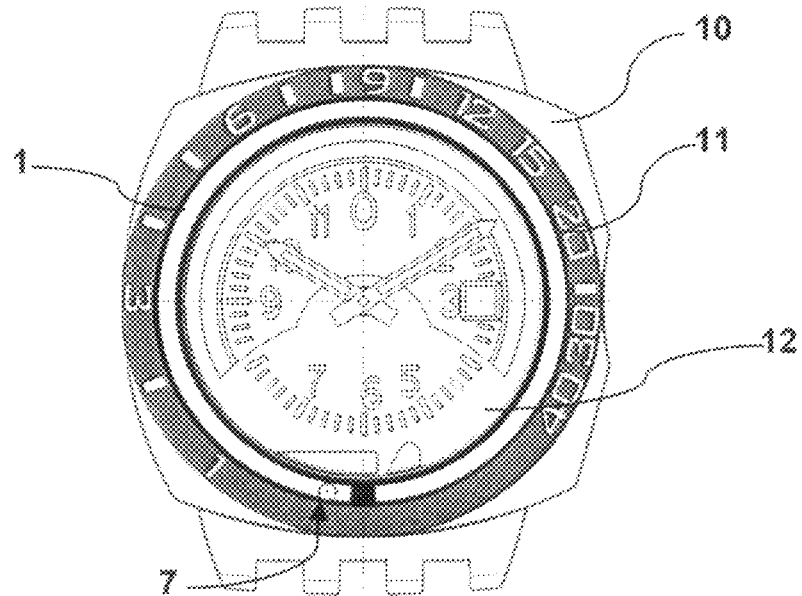

FIGS. 5 and 6 illustrate the operation of the depth gauge. In FIG. 5, at a depth of 6 meters, the pressure exerted by the water exerts sufficient force to allow the water to enter to the graduation corresponding to 6. At this location, the water/air interface 8 allows precise reading of the current depth. The isosceles triangle configuration of the capillary tube contributes to forming a clear, stable water/air interface 8. The total reflection effect described above causes a delimitation of the depth gauge between two sectors, namely an "air" sector 14, in which the capillary tube is filled with air, and a "water" sector 15, in which the capillary tube is filled with water. In this embodiment example, the "air" sector 14 presents reflection surfaces 4 provided with light colours to the user. Conversely, "water" sector 15 allows the user to see the dark background 3 of the depth gauge. The depth variations cause the significance of "water" sector 15 to vary relative to "air" sector 14, with the "water" sector becoming increasingly marked with the increase in depth. When the depth decreases, the "water" sector is reduced, until the configuration shown in FIG. 6 is reached, in which the watch is in the open air. A scale 11 is graduated and calibrated to indicate the depth at which the watch is located in substantially real time, by observing the position of the water/air interface 8 opposite the scale.

Figure 7:
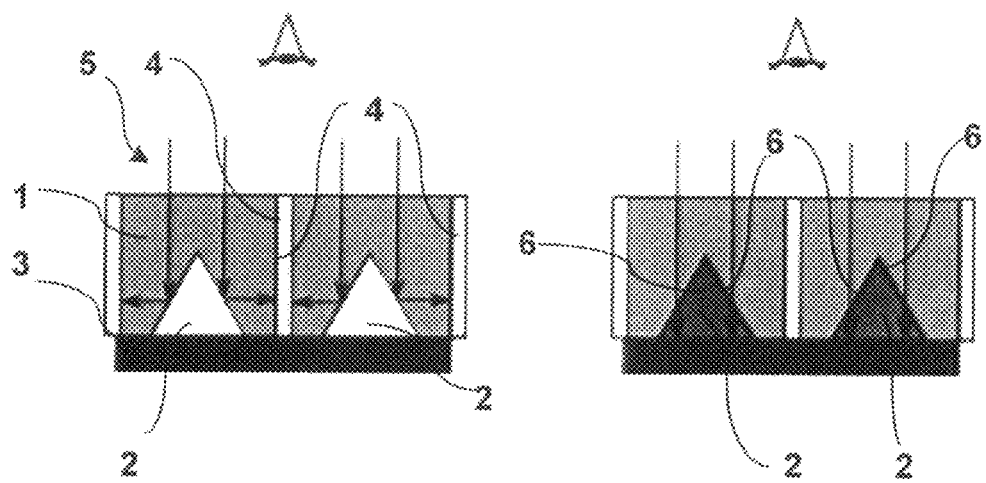
FIG. 7 is a transverse cross-section of a depth gauge according to a second embodiment of the invention.

FIG. 7 shows a variant in which two capillary tubes 2 are arranged side by side, to form a double reading zone, and thereby make it easier to read the depth, in particular when the user is in deeper waters, where visibility is often reduced. This arrangement with two or more capillary tubes arranged side by side also increases the robustness of the depth measurement. Thus, if one of the capillary tubes is not working properly, the user preserves a depth measurement as a result of the other capillary tube which is still working.

Figure 8:
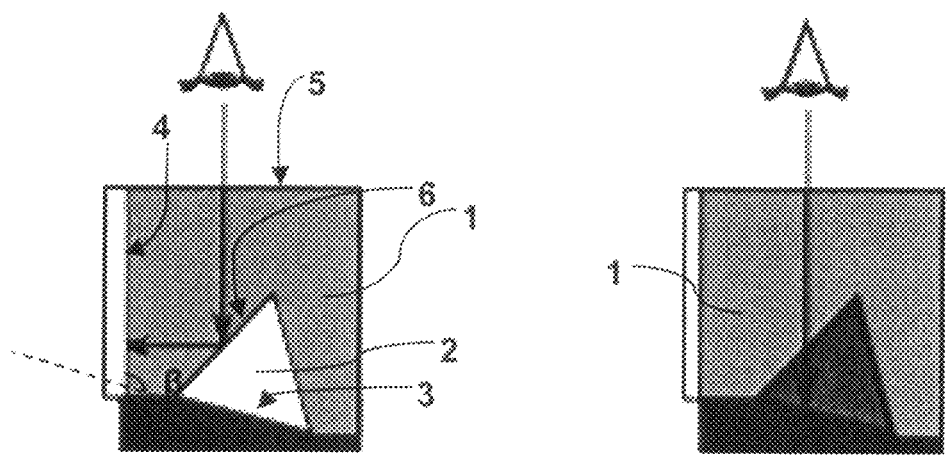
FIG. 8 is a transverse cross-section of a depth gauge according to a third embodiment of the invention.

FIG. 8 shows another variant in which the background 3 is slightly inclined in order to increase the width visible by the user of one of active sides 6. The inclination causes an inhibition in the reflection effect on the other side of the triangle. The inclination of background 3 is advantageously provided such that the angle α is greater than 90 degrees and preferably comprised between 100 and 120 degrees. The effect of this type of arrangement with an inclined background is to improve the optical effect by choosing an optimum angle of inclination for one of the sides of the capillary tube.

The Figures and the descriptions thereof given above illustrate rather than limit the invention. In particular, the invention and variants thereof have just been described with reference to a particular example including a depth gauge provided with a circular capillary tube, integrated in the periphery of a watch case. However, it is clear to those skilled in the art that the invention can be extended to other embodiments, with variants in which one or more capillary tubes of other shapes are provided, for example linear tubes, arranged on one of the sides or on the base of a watch display.

The verbs "include" and "comprise" do not exclude the presence of elements other than those listed in the claims. The word "one" or "a" before an element does not exclude the presence of a plurality of such elements.

What is claimed is:

1. A capillary depth gauge including at least one capillary tube of triangular section arranged against a background opposite an observation surface and visible by transparency from the observation surface when the tubular section is substantially filled with water, at least one reflection surface, visible by reflection from said observation surface when the tubular section is substantially filled with air, wherein said capillary tube forms an isosceles triangle whose equal angles (α) have an angular value of between 48 and 60 degrees and in that said at least one reflection surface is arranged opposite one of said sides of said isosceles triangle.

2. The capillary depth gauge according to claim 1, wherein angle (α) has a value of between 50 and 55 degrees.

3. The capillary depth gauge according to claim 2, wherein angle (α) is substantially equal to 50 degrees.

4. The capillary depth gauge according to claim 1, wherein the narrowest surface of the tube has a width of less than 1.5 mm.

5. The capillary depth gauge according to claim 1, wherein the capillary tube is arranged to present two active sides visible from the observation surface.

6. The capillary depth gauge according to claim 1, wherein the background and the reflection surface form an angle of substantially 90 degrees.

7. The capillary depth gauge according to claim 1, wherein the capillary tube is arranged to present a single active side visible from the observation surface.

8. The capillary depth gauge according to claim 7, wherein the background and the reflection surface form an angle (β) greater than 90 degrees.

9. The capillary depth gauge according to claim 1 including a plurality of capillary tubes arranged side by side.

10. A watch including a watch case and a depth gauge including at least one capillary tube of triangular section arranged against a background opposite an observation surface and visible by transparency from the observation surface when the tubular section is substantially filled with water, at least one reflection surface, visible by reflection from said observation surface when the tubular section is substantially filled with air, wherein said capillary tube forms an isosceles triangle whose equal angles (α) have an angular value of between 48 and 60 degrees and in that said at least one reflection surface is arranged opposite one of said sides of said isosceles triangle.

11. The watch according to claim 10, wherein the depth gauge is arranged on the periphery of the watch case and has an aperture in liquid communication with the ambient environment.

* * * * *